United States Patent [19]

Lee

[11] Patent Number: 5,432,879
[45] Date of Patent: Jul. 11, 1995

[54] NONDISCONNECTABLE FC/PC FIBER OPTIC CONNECTOR ASSEMBLY

[75] Inventor: Hsin Lee, Issaquah, Wash.

[73] Assignee: Augat Inc., Mansfield, Mass.

[21] Appl. No.: 239,596

[22] Filed: May 9, 1994

[51] Int. Cl.[6] .................................... G02B 6/38
[52] U.S. Cl. .................................. 385/60; 385/56
[58] Field of Search ................. 385/58, 60, 70, 72, 385/56

[56] References Cited

U.S. PATENT DOCUMENTS

| | | | |
|---|---|---|---|
| 4,444,461 | 4/1984 | Wey et al. | 385/72 |
| 4,793,683 | 12/1988 | Cannon, Jr. et al. | 385/60 |
| 4,805,980 | 2/1989 | Mackenroth | 385/60 |
| 4,852,963 | 8/1989 | Lampert | 385/60 |
| 4,900,125 | 2/1990 | Iyer | 385/70 |
| 4,953,941 | 9/1990 | Takahashi | 385/72 |
| 5,029,973 | 7/1991 | Rink | 385/60 |
| 5,074,637 | 12/1991 | Rink | 385/56 |
| 5,129,023 | 7/1992 | Anderson et al. | 385/70 |

Primary Examiner—John D. Lee
Attorney, Agent, or Firm—Weingarten, Schurgin, Gagnebin & Hayes

[57] ABSTRACT

A nondisconnectable fiber optic connector assembly includes two fiber optic connectors and an interconnection assembly for joining the two connectors. Each connector has a connector nut and a connector body axially movable within the housing. A ferrule is provided within the connector body for retaining the fiber. The ferrules and connector bodies are axially movable with respect to the interconnection assembly and the connector nuts, and the ferrules are biased toward each other to hold the fibers in contact. The biasing also allows one ferrule to follow its mating ferrule in the event of outwardly directed axial movement of the mating ferrule. A stop member within each connector limits the outwardly directed axial movement of each ferrule, thereby preventing the optical connection from disconnecting.

16 Claims, 4 Drawing Sheets

NONDISCONNECTABLE FC/PC FIBER OPTIC CONNECTOR ASSEMBLY

FIELD OF THE INVENTION

This invention relates to connectors and more particularly to fiber optic connectors.

BACKGROUND OF THE INVENTION

To mate the optical fibers in one-piece FC/PC fiber optic connectors, the mating connectors are aligned and held in connection by an interconnection assembly. Typically, within each one-piece connector, an optical fiber is held in a ferrule, which is aligned and abutted against a corresponding ferrule in the mating one-piece connector. The ferrule is biased in some manner, such as by a compression spring, into abutting relationship with the opposed ferrule of the mating one-piece connector to maintain contact between the fiber ends. The biasing allows the ferrule to move axially within the connector. In addition, if one cable or connector is pulled or otherwise placed under tension, whether accidently or purposefully, the mating ferrule follows the pulled ferrule due to the biasing. However, if the distance traveled by the ferrule being pulled exceeds the distance traveled by the mating ferrule, the terminations of the fibers separate, creating a disconnection between the two fibers. Accordingly, it would be desirable to have a fiber optic connector assembly in which the fibers are not subject to disconnection when a tension force is applied to one connector or cable.

SUMMARY OF THE INVENTION

The present invention provides a FC/PC fiber optic connector assembly which does not disconnect when one connector or fiber cable is pulled. The nondisconnectable fiber optic connector assembly includes two fiber optic connectors and an interconnection assembly for joining the two connectors. Each connector has a connector nut and a connector body axially movable within the nut. A ferrule is provided within the connector body for retaining the fiber. The ferrules and connector bodies are axially movable with respect to the interconnection assembly and the connector nuts, and the ferrules are biased toward each other to hold the fibers in contact. The biasing also allows one ferrule to follow its mating ferrule in the event of outwardly directed axial movement of the mating ferrule.

A stop member within each connector limits the outwardly directed axial movement of each connector body and ferrule, thereby preventing the ferrules from disconnecting. The stop member in each connector is provided by opposed faces between the connector body and the connector nut. When no axial force is exerted on the connector bodies or fibers, a first gap is maintained between the opposed faces. Under an outwardly directed axial force exerted on one connector body or fiber cable, the pulled body and associated ferrule tend to move in the direction of the force. After the body travels the distance of the gap, the opposed faces of the body and nut abut, thereby limiting further travel of the body and associated ferrule.

The biasing of the mating ferrules into contact allows the mating ferrule to follow the pulled ferrule. The connector body and nut include a second gap larger than the first gap. The larger second gap provides a greater axial travel distance for the mating connector body. Thus, the mating connector body and ferrule are not so limited in distance of axial travel in the direction of the pulled connector body, ensuring that the mating ferrules maintain contact therebetween to maintain the optical connection.

DESCRIPTION OF THE DRAWINGS

The invention will be more fully understood from the following detailed description taken in conjunction with the accompanying drawings in which.

DETAILED DESCRIPTION OF THE INVENTION

Figure 1:
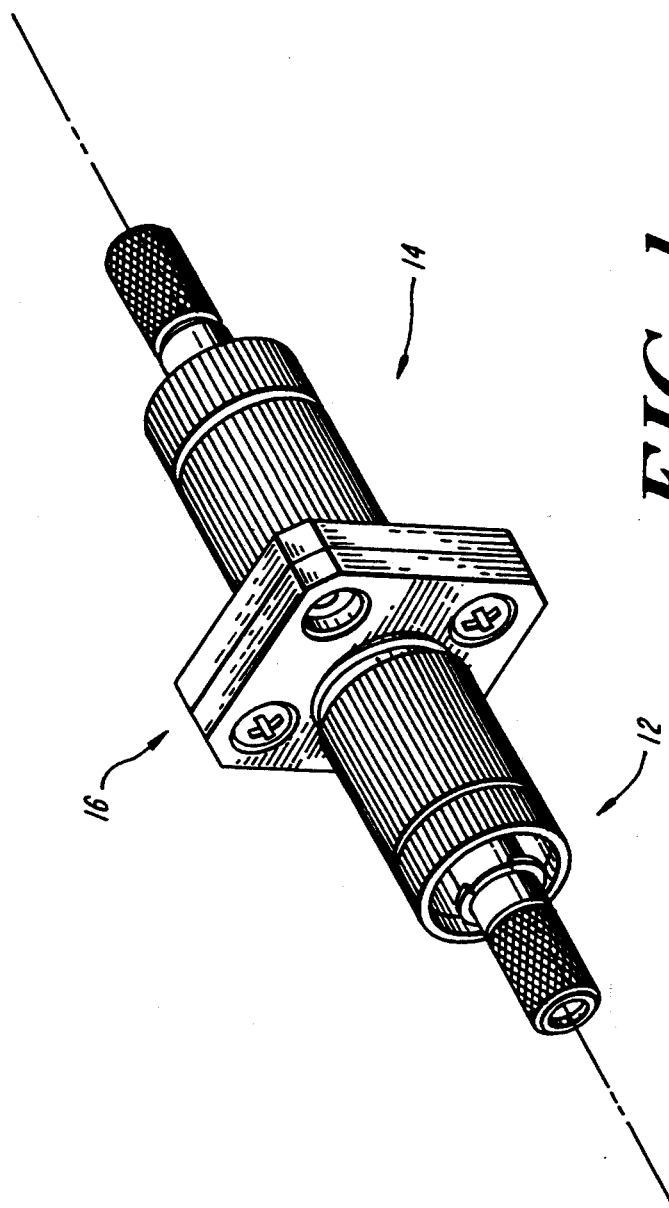
FIG. 1 is a perspective view of a fiber optic connector assembly according to the present invention.

As shown in FIG. 1, a connector assembly according to the present invention includes a first connector 12 and a second connector 14. The two connectors are interconnected by an interconnection assembly 16. Each connector is identical, being assembled in mirror image; thus only one of the two connectors will be described in detail, like parts being identified by the same reference numerals.

Figure 2:
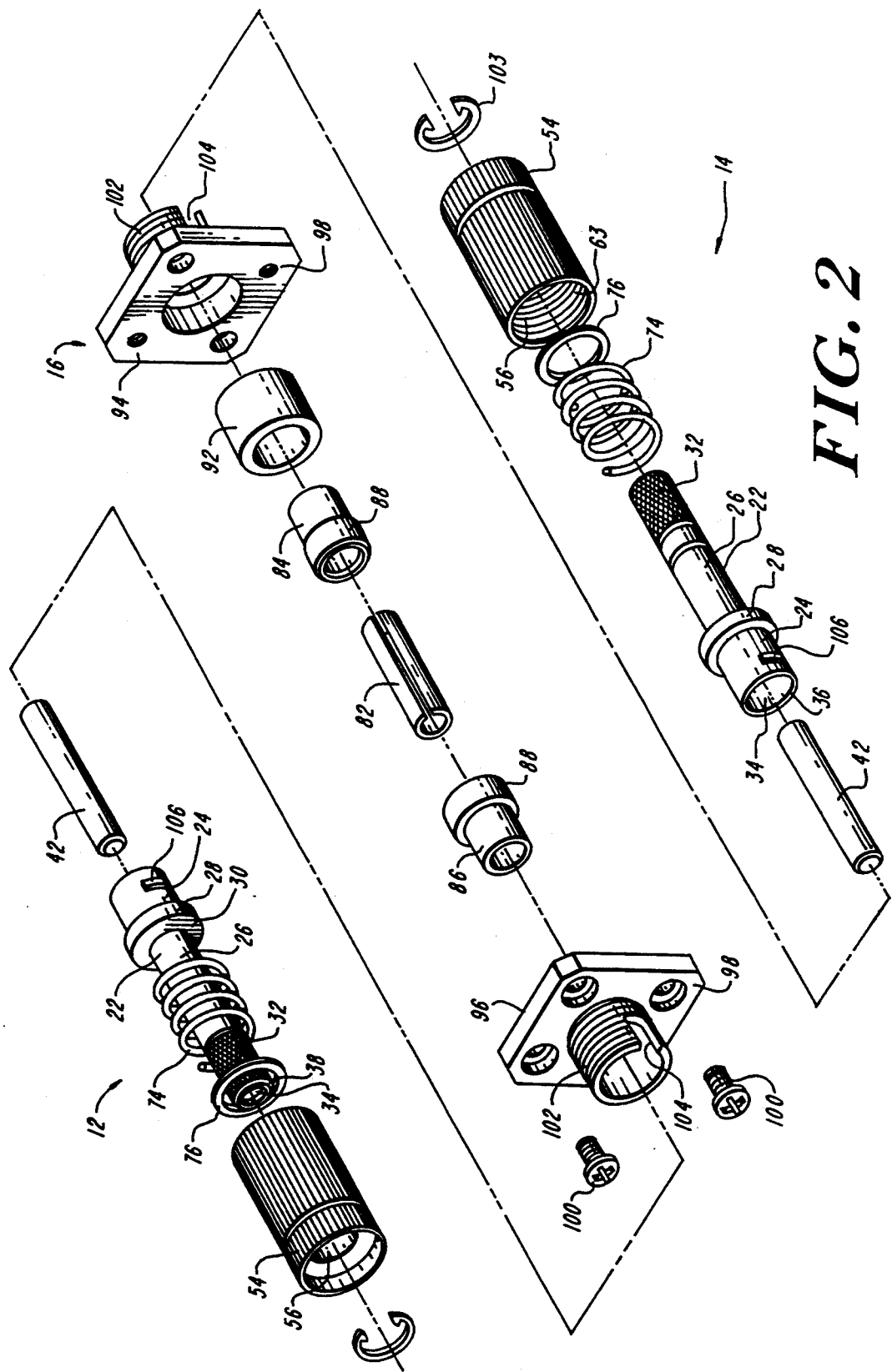
FIG. 2 is an exploded perspective view of the fiber optic connector assembly of FIG. 1.

Referring to FIG. 2, the connector 12 or 14 includes a connector body 22 having a widened portion 24 and a narrowed portion 26. An annular flange 28 extends circumferentially around the connector body to separate the widened and narrowed portions. The annular flange provides an annular shoulder 30, to be discussed more fully below. The narrowed portion may be knurled on one end 32 for ease of grasping, if desired.

Figure 3:
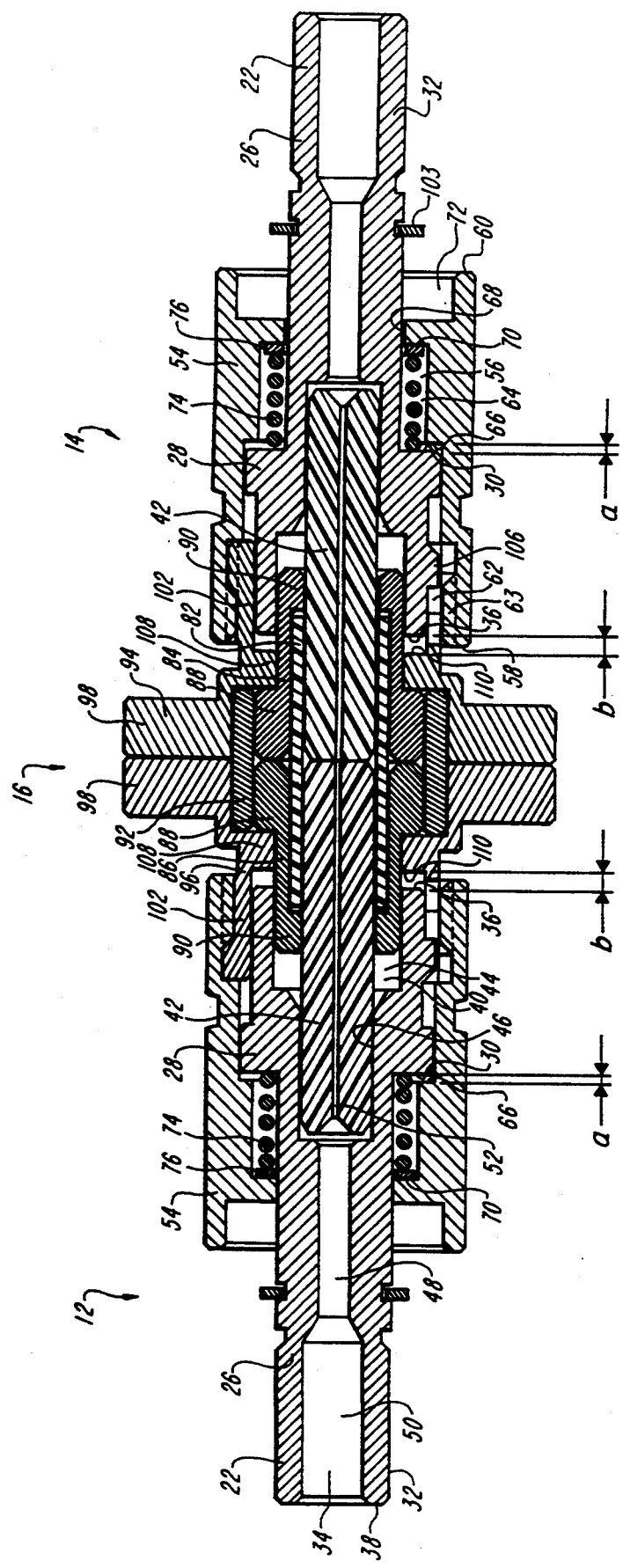
FIG. 3 is a cross-sectional view of the fiber optic connector assembly of FIG. 1 illustrating a neutral position of the connector assembly.

As shown more particularly in FIG. 3, a bore 34 extends through the connector body 22 from a first end 36 of the connector at the widened portion 24 to a second end 38 at the narrowed portion 26. The bore includes a ferrule section 40, in which a ferrule 42 is disposed. The ferrule section includes a wider portion 44 adjacent the first end 36 and a narrower portion 46 sized to engage the ferrule 42. The ferrule may be retained in the ferrule section in any suitable manner, such as by a frictional fit with the narrower portion 46. The bore 34 also includes an intermediate section 48, which is narrower than the ferrule section, and an end section 50. A fiber optic cable (not shown), which is stripped back to expose a section of optical fiber, may be mounted within the end and intermediate sections 48, 50 of the bore 34 with the exposed optical fiber extending through a bore 52 in the ferrule 42.

The connector body 22 is disposed for limited axial movement within a connector nut 54. A bore 56 extends through the nut from a first end 58 to a second end 60. Adjacent the first end 58, the bore includes a widened section 62. One portion 63 of the widened section 62, at the first end, is interiorly threaded, as will be discussed further below. The inner diameter of the widened section 62 is sized to receive the widest diameter of the connector body 22, at the annular flange 28, while still allowing axial movement of the connector body 28 within the nut 54. The bore 56 further includes a central section 64, narrower than the widened section, which is separated from the widened section by a first shoulder 66. The bore also includes a neck section 68, which is similarly separated from the central section 64 by a second shoulder 70. The neck section 68 is narrower than the central section 64 and is sized to correspond with the outer diameter of the narrowed portion 26 of the connector body 22 while still allowing axial movement of the connector body. A wider-diameter termination section 72 is located within the bore at the second end 60 thereof.

As can be seen in the assembled configuration shown in FIG. 3, the connector body 22 fits within the connector nut 54 with the knurled end 32 of the narrowed portion 26 extending beyond the second end 60 of the nut 54. A compression spring 74 is disposed within the central section 64 of the bore 56 of the nut 54 between the annular shoulder 30 of the body 22 and the second shoulder 70 of the nut 54. An O-ring 76 is also provided between the spring 74 and the second shoulder 70. The spring 74 biases the connector body 22 in the direction of the first end 58 of the nut 54.

To mate two one-piece connectors in aligned and abutting relationship, an interconnection assembly 16 is provided. As shown in FIGS. 2 and 3, the interconnection assembly 16 includes a split sleeve 82 which fits over adjacent ends of the abutting ferrules 42. A pair of intermediate members 84, 86 are placed over the split sleeve 82. The intermediate members each include abutting central portions 88 and inwardly facing annular flanges 90 which extend over the ends of the split sleeve 82. An outer sleeve 92 overlies the central portions 88 of the intermediate members 84, 86.

A pair of interconnector bodies 94, 96 are provided to overlie the outer sleeve 92 and intermediate members 84, 86 and hold the two one-piece connectors 12, 14 together. The interconnector bodies 94, 96 each have corresponding flange plates 98 which are held in abutting relationship in any suitable manner, such as by screws 100, as shown.

The interconnector bodies 94, 96 each further include outwardly extending, externally threaded cylindrical bore sections 102. The internally threaded portion 63 of the widened section 62 of each connector nut 54 mates with the external threads of the corresponding interconnector body 94, 96, thereby holding each one-piece connector, retained within its respective nut, to the interconnector assembly. A C-ring 103 is provided to retain the connector nut on the body 22 when the nut is unfastened from the interconnector assembly. The inner diameter of each cylindrical bore section 102 is sized to allow insertion of the widened portion 24 of the corresponding connector body 22. A keyway 104 is formed in the cylindrical bore section. A corresponding upstanding key 106, which is sized to fit within the keyway 104, is provided on the widened portion 24 of the connector body 22 to align the body within the cylindrical bore section 102 and prevent rotation of the body.

As best seen in FIG. 3, an inwardly extending annular flange 108 is disposed in the interior of each cylindrical bore section 102. The flange 108 provides an outwardly facing shoulder 110 disposed in spaced opposition to the first end 36 of the connector body 22 of each one-piece connector.

FIG. 3 shows the assembled connector assembly in a neutral position, in which no tension forces are exerted on the cable (not shown) or connector body in a direction tending to pull the cable out of the connector assembly. In the neutral position, the compression spring 74 in each one-piece connector 12, 14 biases the respective associated connector body 22 and ferrule 42 toward the interconnection assembly 16, thereby maintaining contact between abutting ferrules and fibers. Also, the connector assembly is sized such that, in the neutral position, a small first gap a is present between the annular shoulder 30 of the connector body 22 and the first shoulder 66 of the connector nut 54. In addition, the space between the shoulder 110 of each interconnector body and the first end 36 of each connector body 22 provides a second gap b which, in the neutral position, is larger than the first gap a between the annular shoulder 30 of the connector body and the first shoulder 66 of the connector nut.

Figure 4:
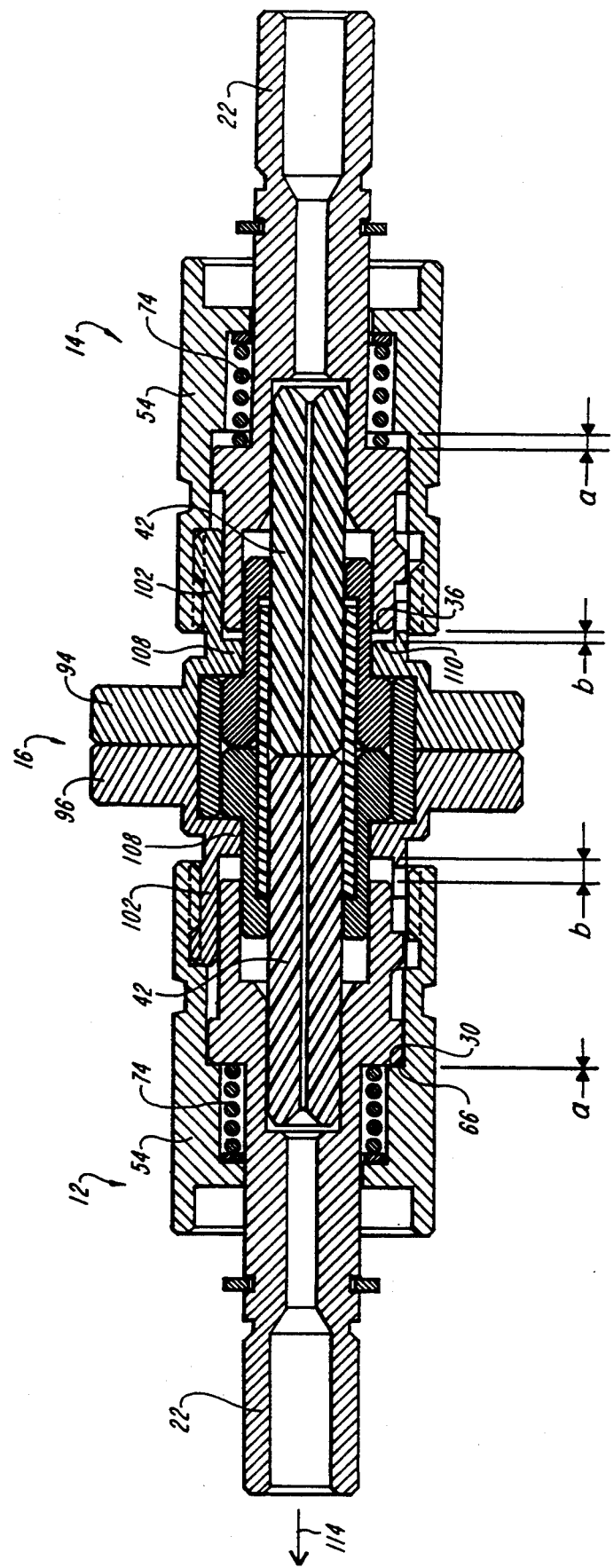
FIG. 4 is a cross-sectional view of the fiber optic connector assembly of FIG. 1 illustrating a pulled position of the connector assembly.

FIG. 4 illustrates the situation of an axial force exerted on one cable or connector body 22 of the connector 12 directed away from the interconnection assembly 16, indicated by arrow 114. The compression spring 74 in the mating connector 14 tends to bias the mating ferrule 42 and its contained fiber in the same direction, thereby maintaining the connection between the opposed ends of the abutting fibers. In addition, in the connector 12, the first shoulder 66 of the connector nut 54 serves as a stop, since the annular shoulder 30 of the connector body 22 abuts against the first shoulder 66, closing up the first gap a, thereby limiting the travel of the pulled ferrule 42. Since the first gap a is smaller than the second gap b, the ferrule 42 of the mating one-piece connector 14 is not so limited in its travel and is not prevented from remaining in contact with the adjacent ferrule. As shown in FIG. 4, the first gap a of the connector 12 between the annular shoulder 30 and first shoulder 66 closes completely, while the second gap b of the mating connector 14 becomes smaller, but does not close up completely. Accordingly, unlike prior art one-piece fiber optic connector assemblies, no disconnection between the fibers occurs.

Similarly, if an axial force were exerted on the connector 14 directed away from the interconnection assembly 16, the gap a of the connector 14 would close completely, limiting the axial travel of the ferrule 42 of the connector 14. The gap b of the mating connector 12 would become smaller, but would not close up completely. Thus, the ferrule 42 of the mating connector 12 would not be so limited in its axial travel and would not be prevented from remaining in contact with the adjacent ferrule.

The invention is not to be limited by what has been particularly shown and described, except as indicated by the appended claims.

I claim:

1. A fiber optic connector assembly comprising:
a first fiber optic connector adapted to receive a first fiber optic cable and a second fiber optic connector adapted to receive a second fiber optic cable, each of said first and second fiber optic connectors comprising:
   a connector nut having a longitudinal axis, a stop member disposed within said connector nut,
   a connector body disposed within said connector nut for limited axial movement within said connector nut with respect to said longitudinal axis, the axial movement being limited in a direction toward said stop member by said stop member of said connector nut,
   a ferrule for retaining an optical fiber disposed within said connector body along said longitudinal axis, a biasing member for biasing said connector body and said ferrule along said longitudinal axis away from said stop member of said connector nut; and an interconnection assembly connected to each of said connector nuts of said first and second fiber optic connectors to connect each of said first and second fiber optic connectors together in mirror image orientation along said longitudinal axis with each of said ferrules in abutting relationship and sized to maintain a gap between said stop member and said connector body under no externally applied tensile force and to allow axial movement of said ferrules along said longitudinal axis in response to an externally applied tensile force.

2. The fiber optic connector assembly of claim 1, wherein the axial movement of said connector body from a neutral position in a direction away from said stop member of said connector nut is greater than the axial movement of said connector body from the neutral position in the direction toward said stop member of said connector nut.

3. The fiber optic connector assembly of claim 1, wherein said biasing member of each of said first and second fiber optic connectors comprises a compression spring.

4. The fiber optic connector assembly of claim 1, wherein said biasing member of each of said first and second fiber optic connectors abuts against a shoulder of said connector nut.

5. The fiber optic connector assembly of claim 1, wherein said stop member comprises an interiorly disposed annular shoulder of said connector nut.

6. The fiber optic connector assembly of claim 5, wherein said connector body further comprises a further annular shoulder disposed in opposition to said annular shoulder of said connector nut, whereby abutment of said annular shoulder and said further annular shoulder limits the axial movement of said connector body.

7. The fiber optic connector assembly of claim 1, wherein said connector nut of each of said first and second fiber optic connectors is fixedly attached to said interconnection assembly.

8. A fiber optic connector assembly comprising:
a first fiber optic connector adapted to receive a first fiber optic cable and a second fiber optic connector adapted to receive a second fiber optic cable, each of said first and second fiber optic connectors comprising:
a connector nut having a longitudinal axis, said connector nut having a first face,
a connector body disposed for limited axial movement with respect to said longitudinal axis within said connector nut, said connector body having a second face disposed in opposition to said first face of said connector nut, said connector body further having an end face,
a ferrule for retaining an optical fiber disposed within said connector body along said longitudinal axis,
a biasing member for biasing said connector body and said ferrule along said longitudinal axis toward one end of said connector nut, and said biasing member, said connector nut, and said connector body being sized to maintain a first gap between said first face and said second face when no axial force is applied to said connector nut along said longitudinal axis; and
an interconnection assembly circumferentially disposed about said first and second fiber optic connectors and connected to each of said connector nuts of said first and second fiber optic connectors to connect each of said first and second fiber optic connectors together in mirror image orientation along said longitudinal axis with each of said ferrules in abutting relationship and sized to allow axial movement of said ferrules along said longitudinal axis, said interconnection assembly further comprising a pair of outwardly opposed third faces, each of said third faces disposed in opposition to a respective one of said end faces of said first and second fiber optic connectors, said interconnection assembly and said first and second fiber optic connectors being further sized to maintain a second gap between said end faces and said third faces when no axial force is applied to said first and second fiber optic connectors along said longitudinal axis, said second gap being larger than said first gap;
whereby a tensile force directed along said longitudinal axis causes a pulled one of said first and second connector bodies and an associated one of said ferrules to travel the distance of said first gap until said first gap is closed by abutment of said first face and said second face, thereby limiting further axial movement of said pulled one of said first and second connector bodies and the associated one of said ferrules in outward direction of travel along said longitudinal axis.

9. The fiber optic connector assembly of claim 8, wherein said biasing member of each of said first and second fiber optic connectors comprises a compression spring.

10. The fiber optic connector assembly of claim 8, wherein said biasing member of each of said first and second fiber optic connectors is disposed between said second face of said connector body and a shoulder of said connector nut.

11. The fiber optic connector assembly of claim 8, wherein said connector nut of each of said first and second fiber optic connectors is fixedly attached to said interconnection assembly.

12. The fiber optic connector assembly of claim 8, wherein said interconnection assembly is cooperatively threaded at opposite ends and said connector nut of each of said first and second fiber optic connectors is cooperatively threaded at one end for attachment to said interconnection assembly.

13. The fiber optic connector assembly of claim 8, wherein said interconnection assembly further comprises a pair of interconnector bodies, said interconnector bodies being removably attached together to connect each of said first and second fiber optic connectors together.

14. The fiber optic connector assembly of claim 8, wherein said interconnection assembly further comprises a sleeve assembly disposed to overlie abutting ends of said ferrules of said first and second fiber optic connectors, said sleeve assembly sized to allow axial movement with respect to said longitudinal axis of said ferrules.

15. The fiber optic connector assembly of claim 8, a key assembly disposed on said interconnection assembly and said connector bodies of each of said first and second fiber optic connectors to align said connector bodies with respect to said interconnection assembly.

16. The fiber optic connector assembly of claim 8, wherein said ferrule of each of said first and second connector bodies is fixedly retained within said connector body.

* * * * *